United States Patent

Kobayashi

Patent Number: 5,994,433
Date of Patent: Nov. 30, 1999

[54] FLAME-RETARDANT RESIN COMPOSITION

[75] Inventor: Michio Kobayashi, Sakai, Japan

[73] Assignee: Daicel Chemical Industries, Ltd., Osaka, Japan

[21] Appl. No.: 08/786,296

[22] Filed: Jan. 22, 1997

Related U.S. Application Data

[63] Continuation of application No. 08/431,753, May 1, 1995, Pat. No. 5,627,228.

[30] Foreign Application Priority Data

| May 10, 1994 | [JP] | Japan | 6-121907 |
| Oct. 26, 1994 | [JP] | Japan | 6-287309 |

[51] Int. Cl.$^6$ ............................................ C08K 5/52
[52] U.S. Cl. .......................... 524/127; 524/141; 524/143
[58] Field of Search ................................... 524/127, 141, 524/143

[56] References Cited

U.S. PATENT DOCUMENTS

| 4,248,976 | 2/1981 | Clubley et al. |
| 4,526,917 | 7/1985 | Axelrod . |
| 4,556,684 | 12/1985 | Gunkel et al. |
| 4,751,260 | 6/1988 | Kress et al. |
| 4,837,276 | 6/1989 | Fuhr et al. |
| 4,914,144 | 4/1990 | Muehlbach et al. |
| 5,036,126 | 7/1991 | Rinehart et al. |
| 5,061,745 | 10/1991 | Wittmann et al. |
| 5,122,556 | 6/1992 | Kambour . |
| 5,135,973 | 8/1992 | Fukasawa et al. |
| 5,157,065 | 10/1992 | Fuhr et al. |
| 5,204,394 | 4/1993 | Gosens et al. |
| 5,234,979 | 8/1993 | Tödtemann et al. |
| 5,258,432 | 11/1993 | Ogoe et al. |

FOREIGN PATENT DOCUMENTS

| 0521628 | 1/1993 | European Pat. Off. |
| 0594021 | 4/1994 | European Pat. Off. |
| 59-45351 | 3/1984 | Japan . |
| 59-202240 | 11/1984 | Japan . |
| 61-62556 | 3/1986 | Japan . |
| 62-4746 | 1/1987 | Japan . |
| 2-115262 | 4/1990 | Japan . |
| 4-298554 | 10/1992 | Japan . |
| 5-179123 | 7/1993 | Japan . |
| 5-262940 | 10/1993 | Japan . |
| 5-279531 | 10/1993 | Japan . |
| 7-11118 | 1/1995 | Japan . |
| 7-11119 | 1/1995 | Japan . |

*Primary Examiner*—Veronica P. Hoke
*Attorney, Agent, or Firm*—Birch, Stewart, Kolasch & Birch, LLP

[57] ABSTRACT

A flame-retardant of an aromatic phosphoric acid ester of formula (I) and a fluororesin such as polytetrafluoroethylene, are added to a mixture of an aromatic polycarbonate and a styrenic resin:

$$R^1-O-\underset{\underset{R^2}{|}}{\overset{\overset{O}{\|}}{P}}-\left[O-A-O-\underset{\underset{R^3}{|}}{\overset{\overset{O}{\|}}{P}}\right]_n O-R^4 \quad (I)$$

wherein (i) at least one of $R^1$ to $R^4$ is a 2,3-dialkylphenyl group, a 3,4-dialkylphenyl group or a 3,5-dialkylphenyl group each substituted with alkyl groups each having 1 to 3 carbon atoms, A is a phenylene group, n denotes an integer of 0 to 5, and $R^1$ to $R^4$ contain the dialkylphenyl group and a monoalkylphenyl group in a ratio of the former/the latter is 50/50 to 90/10 (% by weight); or (ii) at least one of $R^1$ to $R^4$ is a phenyl group substituted with 1 to 5 alkyl groups each having 1 to 4 carbon atoms, A is 1,3-phenylene group and n denotes an integer of 1 to 5. The flame-retardant may be a mixture of the compound (i) and the compound (ii).

13 Claims, No Drawings

FLAME-RETARDANT RESIN COMPOSITION

This application is a continuation of application Ser. No. 08/431,753, filed on May 1, 1995, now U.S. Pat. No. 5,627,228, the entire contents of which are hereby incorporated by reference.

FIELD OF THE INVENTION

The present invention relates to a polycarbonate-containing flame-retardant resin composition which has excellent molding processability (moldability) properties such as melt fluidity.

BACKGROUND OF THE INVENTION

A mixture of a polycarbonate and a styrenic resin such as ABS resin, SAN resin and so forth has high heat resistance and impact resistance, so that it is generally used, as a polymer alloy, for various shaped or molded articles such as parts for an automobile, electric products, an electronic products and the like. When the polymer alloy is employed for a housing, an enclosure, a chassis or the like of electric or electronic parts or office automation (OA) apparatus or instruments, flame-retardancy or fire-resistance is required of such a polymer alloy.

In particular, for increasing the safety of a product, a standard qualification of V-O or 5 V is recently frequently required of a shaped article of an OA apparatus or a home electric product. While the V-O or 5 V standard is the highest flame-retardancy level according to the Subject 94 of Underwriter's Laboratory Co., Ltd. (hereinafter briefly referred to as UL) it is used as the flame-retardancy standard in U.S.A.

On the other hand, in order to decrease the amount of material used only miniaturization and also making the part or the housing thinner is useful. Such part or housing has, however, a risk of a fire drip arising from the thinned part of the shaped article accompanied with burning (combustion), and thus spreading fire to another inflammable or combustible substance. Accordingly, a flame-retardant resin composition is also required for such a higher flame resistance or flame-retardancy is as not to cause a flame drip.

For imparting the flame-retardancy, a halogen-containing flame-retardant is usually added to a polymer alloy comprising a polycarbonate and a styrenic resin. As the halogen-containing flame-retardant, there may frequently be employed a combination of a bromine-containing flame-retardant exemplified as tetrabromobisphenol A or its oligomer, a brominated epoxy oligomer, and a flame-retarding-auxiliary comprising, as a main component, a metallic oxide exemplified as antimony trioxide. It is, however, pointed out by an organization for environmental protection in Europe that, among such bromine-containing flame-retardants, use of decabromodiphenyl ether (DBDPE) or octabromodiphenyl ether (OBDPE) possibly generates toxic dibenzodioxin with burning of the resin composition. Therefore, a non-halogen-containing making a flame-retardant is useful for flame-retarding (flame-proofing) resin.

As the non-halogen-containing flame-retardant, a phosphorus-containing flame-retardant, specifically a flame-retardant comprising an aromatic phosphoric acid ester is employed. For example, U.S. Pat. No. 5,061,745 corresponding to Japanese Patent Application Laid-open No. 32154/1990 (JP-A-2-32154) discloses the use of a flame-retardant comprising a monomeric phosphoric acid ester in combination with polytetrafluoroethylene as a flame-retarding-auxiliary. U.S. Pat. No. 5,204,394 discloses an addition of an oligomeric phosphoric acid ester to a mixture of a polycarbonate and a styrenic resin. Further, U.S. Pat. No. 5,122,556 discloses the use of a polycarbonate and a flame-retardant of a dimeric phosphoric acid ester. Moreover, an addition of such flame-retardant comprising a phosphoric acid ester to a polymer alloy comprising a polycarbonate and a styrenic resin is also disclosed in Japanese Patent Application Laid-open Nos. 62556/1986 (JP-A-61-62556), 4746/1987 (JP-A-62-4746), 115262/1990 (JP-A-2-115262), 298554/1992 (JP-A-4-298554), 179123/1993 (JP-A-5-179123), 262940/1993 (JP-A-5-262940), 279531/1993 (JP-A-5-279531) and so on.

Use of these flame-retardants comprising an aromatic substituted or non-substituted phosphoric acid ester can impart flame-retardancy and impact resistance suitably to a polymer alloy comprising a polycarbonate and a styrenic resin. Therefore, some of such resin composition as a molding material for a home electric apparatus or an OA apparatus has been commercially implemented.

The polymer alloy comprising the non-halogen-containing flame-retardant has, however, frequently poor melt fluidity during the molding process. Accordingly, a shaped article or molded article requiring not only miniaturization but also lightening and thinning can hardly be produced with high efficiency, by imparting high fluidity (flowability) to the polymer alloy.

Further, the polymer alloy is liable to become attached to a mold of the molding machine and thus a frequent cleaning of the mold is required. Deterioration or degradation by residence of the resin by, for example, heat or thermal degradation of the flame-retardant is apt to occur during the molding process.

Furthermore, even if using a polymer alloy having comparatively high melt fluidity, the resultant molded article may have poor light resistance (light stability) and is liable to be discolored. The heat resistance, impact resistance, mechanical strength and the like of the molded article is likely to be decreased when increasing or enhancing the melt fluidity. For instance, the heat resistance and flame-retardancy of the shaped article is liable to be decreased with an increased ratio of the styrenic resin relative to the polycarbonate, although the melt fluidity is enhanced. Accordingly, the light resistance, heat resistance and impact resistance and the mechanical strength of the molded article can hardly be increased with maintaining high melt fluidity.

SUMMARY OF THE INVENTION

Thus, it is an object of the present invention to provide a flame-retardant resin composition, whereby high flame-retardancy can be imparted to a molded article, and which has high melt fluidity.

It is another object of the invention to provide a flame-retardant resin composition whereby a molded article having a thin portion can be molded with high accuracy.

Another object of the present invention is to provide, in a polymer alloy system comprising a polycarbonate and a styrenic resin, a resin composition wherein flame drip during burning can be inhibited or suppressed and which has high flame-retardancy or flame resistance.

A further object of the invention is to provide a flame-retardant resin composition which is useful for obtaining a shaped article excellent in flame-retardancy, heat resistance, impact resistance and mechanical strength.

It is yet another object of the present invention to provide a flame-retardant resin composition which has high melt fluidity and is useful for obtaining a molded article having not only high flame-retardancy but also excellent light resistance.

Yet another object of the present invention is to provide a flame-retardant resin composition which is useful for obtaining a shaped article excellent in flame-retardancy, light resistance, heat resistance, impact resistance and mechanical strength.

The present inventor made intensive investigations to achieve the above objects and, as a result, found that when an aromatic phosphoric acid ester having an alkyl group substituted on a specific position of the phenyl group is used as a non-halogen-containing flame-retardant, not only the flame-retardancy but also the melt fluidity can be improved, and thus a shaped article (molded article) can be molded in high accuracy. Further, he found that by using a specific nucleus-substituted aromatic phosphoric acid ester having 1,3-phenylene group as the non-halogen-containing flame-retardant, a resin composition having high melt fluidity can be obtained, and a shaped article having high flame-retardancy, and further high light resistance, can be obtained in high accuracy. The present invention has been accomplished based on these findings.

Accordingly, a flame-retardant resin composition of the present invention comprises (A) an aromatic polycarbonate, (B) a styrenic resin, (C) a flame-retardant of an aromatic phosphoric acid ester shown by the following formula (I)

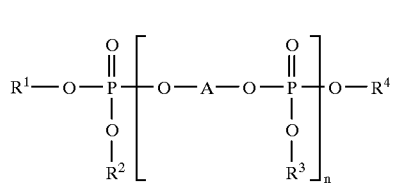

(I)

wherein $R^1$, $R^2$, $R^3$ and $R^4$ independently represent a phenyl group which may be substituted with an alkyl group having 1 to 4 carbon atoms, A represents an aromatic residue, and n denotes an integer of 0 to 5, and (D) a fluororesin, wherein said flame-retardant (C) is (i) a compound shown by the formula (I) where $R^1$ to $R^4$ independently represent a phenyl group substituted with 0 to 3 alkyl groups each having 1 to 4 carbon atoms and at least one of $R^1$ to $R^4$ is a 2,4-dialkylphenyl group, a 3,4-dialkylphenyl group or a 3,5-dialkylphenyl group, (ii) a compound shown by the formula (I) where A is 1,3-phenylene group, n denotes an integer of 1 to 5 and at least one of $R^1$ to $R^4$ is a phenyl group substituted with 1 to 5 alkyl groups each having 1 to 4 carbon atoms, or (iii) a mixture of the compound (i) and the compound (ii).

In the compound (i) of the formula (I), the alkyl group may be an alkyl group having 1 to 3 carbon atoms such as methyl group and ethyl group, and A may be a phenylene group. The proportion of the amount of the 2,4-dialkylphenyl group, the 3,4-dialkylphenyl group and the 3,5-dialkylphenyl group is, for example, about 50 mole percent or more based on the total amount of $R^1$, $R^2$, $R^3$ and $R^4$, and in the phenyl groups represented by $R^1$, $R^2$, $R^3$ and $R^4$, the ratio of the amount of the 2,4-dialkylphenyl group, the 3,4-dialkylphenyl group and the 3,5-dialkylphenyl group relative to the amount of monoalkylphenyl groups may frequently be such that the former/the latter is about 50/50 to 90/10 (mole percent).

In the compound (ii) of the formula (I), the alkyl group may be a methyl group or an ethyl group. In such case, at least one of $R^1$, $R^2$, $R^3$ and $R^4$ may be a phenyl group substituted with 2 alkyl groups each having 1 to 3 carbon atoms, and n may be an integer of 1 to 3.

The styrenic resin (B) includes, for example, a non-rubber-modified styrenic resin such as SAN resin (AS resin), and a rubber-modified styrenic resin such as ABS resin. The fluororesin (D) such as a polytetrafluoroethylene may usually be employed in a powdery or granular form.

DETAILED DESCRIPTION OF THE INVENTION

[Aromatic polycarbonate (A)]

The aromatic polycarbonate (A) includes various polymers, for example a polycarbonate obtainable by a reaction of a dihydric phenol compound and phosgene (phosgene method), or by a reaction of a dihydric phenol compound and a carbonic diester (transesterification method). As examples of the dihydric phenol compound, there may be mentioned an optionally substituted bis (hydroxyaryl)alkane such as bis(4-hydroxyphenyl)methane, 1,1-bis(4-hydroxyphenyl)ethane, 2,2-bis(4-hydroxyphenyl)propane, 1,1-bis(4-hydroxyphenyl)butane, 1,1-bis(4-hydroxyphenyl)isobutane, 2,2-bis(4-hydroxyphenyl)butane, 2,2-bis(4-hydroxy-3-methylphenyl)propane, 2,2-bis(4-hydroxy-3-t-butylphenyl)propane, 2,2-bis(3,5-dimethyl-4-hydroxyphenyl)propane, 2,2-bis(4-hydroxy-3-cyclohexylphenyl)propane and 2,2-bis(4-hydroxy-3-methoxyphenyl)propane; an optionally substituted bis (hydroxyaryl)cycloalkane such as 1,1-bis(4-hydroxyphenyl) cyclopentane, 1,1-bis(4-hydroxyphenyl)cyclohexane, 1,1-bis(4-hydroxyphenyl)cyclododecane and others; a dihydroxyaryl ether such as 4,4'-dihydroxyphenyl ether and 4,4'-dihydroxy-3,3'-dimethylphenyl ether; a dihydroxydiaryl sulfide such as 4,4'-dihydroxydiphenyl sulfide and 4,4'-dihydroxy-3,3'-dimethyldiphenyl sulfide; a dihydroxydiaryl sulfoxide such as 4,4'-dihydroxydiphenyl sulfoxide and 4,4'-dihydroxy-3,3'-dimethyldiphenyl sulfoxide; a dihydroxydiaryl sulfone such as 4,4'-dihydroxydiphenyl sulfone and 4,4'-dihydroxy-3,3'-dimethyldiphenyl sulfone; a dihydroxydiaryl ketone such as bis(4-hydroxyphenyl) ketone and bis(4-hydroxy-3-methylphenyl) ketone; 1,4-bis(4-hydroxyphenylsulfonyl)benzene, 4,4'-bis(4-hydroxyphenylsulfonyl)benzene, 1,2-bis(4-hydroxyphenoxy)ethane, phenolphthalein and others. These dihydric phenol compounds can be used singly or in combination.

Preferred examples of the dihydric phenol compound include a bisphenol whereby an aromatic polycarbonate having high heat resistance can be obtained. As such bisphenol, there may be mentioned, for instance, a bis (hydroxyphenyl)alkane such as 2,2-bis(4-hydroxyphenyl) propane, a bis(hydroxyphenyl)cycloalkane such as bis(4-hydroxyphenyl)cyclohexane, a dihydroxydiphenyl sulfide, a dihydroxydiphenyl sulfone, a dihydroxydiphenyl ketone and so on. Typically preferred dihydric phenol compound includes, for example, 2,2-bis(4-hydroxyphenyl)propane (namely, bisphenol A) with which a bisphenol A type aromatic polycarbonate can be formed.

In the preparation of the bisphenol A type aromatic polycarbonate, a part of bisphenol A can be replaced by another dihydric phenol compound insofar as the heat resistance, mechanical strength and the like are not adversely affected.

The molecular weight of the polycarbonate is, for example, as a viscosity-average molecular weight measured at 20° C. by using methylene chloride, about 15,000 to 50,000, preferably about 18,000 to 40,000 and more preferably about 20,000 to 30,000. When the molecular weight is less than 15,000, the impact resistance of the shaped article is liable to be decreased, and when it exceeds 50,000, the fluidity (flowability) is apt to be decreased.

The limiting-viscosity of the polycarbonate is, for instance, about 0.3 to 0.7 dl/g, and preferably about 0.3 to 0.65 dl/g in methylene chloride at 20° C.

[Styrenic resin (B)]

The styrenic resin (B) includes a non-rubber-modified styrenic resin (B1) which does not include a rubber component and a rubber-modified styrenic resin (B2). The rubber-modified styrenic resin (B2) may be a mixed composition (B2a) of a rubber component and a styrenic resin, or a grafted polymer (B2b) obtainable by graft-polymerizing a styrenic monomer or a mixture of vinyl monomer comprising a styrenic monomer and non-styrenic vinyl monomer to a rubber component (B21).

The non-rubber-modified styrenic resin (B1) include a homo- or co-polymer of an aromatic vinyl monomer (B1a) and a copolymer obtainable by polymerizing an aromatic vinyl monomer (B1a) and a copolymerizable non-styrenic vinyl monomer.

As examples of the aromatic vinyl monomer (B1a), there may be mentioned a styrenic monomer such as styrene, an alkyl-substituted styrene (for instance, o-methylstyrene, p-methylstyrene, m-methylstyrene, 2,4-dimethylstyrene, p-ethylstyrene, p-t-butylstyrene and the like), an α-alkyl-substituted styrene (e.g. α-methylstyrene, α-methyl-p-methylstyrene, etc.) a halogenated styrene (for instance, o-chlorostyrene, p-chlorostyrene, etc.) and others. Preferred examples of the aromatic vinyl monomer include styrene, p-methylstyrene and α-methylstyrene, particularly, styrene and α-methylstyrene. These aromatic vinyl monomers can be employed singly or in combination.

The non-styrenic vinyl monomer includes a copolymerizable vinyl monomer such as vinyl cyanide monomer (B1b) (for example, acrylonitrile, methacrylonitrile), other copolymerizable vinyl monomer (B1c) [e.g. a (meth)acrylic monomer (for instance, a (meth)acrylic acid ester or (meth) acrylic ester of an alkyl having about 1 to 10 carbon atoms such as methyl methacrylate, ethyl acrylate and butyl acrylate, a (meth)acrylic ester having a functional group such as 2-hydroxyethyl methacrylate and 2-hydroxypropyl methacrylate, (meth)acrylic acid and the like), maleic anhydride, N-substituted maleimide and so on].

Preferred examples of the non-styrenic monomer include (meth)acrylonitrile, (meth)acrylic monomer (e.g., (meth) acrylic acid ester of an alkyl having about 1 to 4 carbon atoms such as methyl methacrylate), maleic anhydride, N-substituted maleimide and others, specifically acrylonitrile, an alkyl (meth)acrylate such as methyl methacrylate and so on. Such non-styrenic monomers can also be employed singly or in combination.

The styrenic resin (B1) may, for example, be a homo- or co-polymer of an aromatic vinyl monomer (e.g. polystyrene), or may frequently be (1) a copolymer obtainable by polymerizing the styrenic monomer (B1a) and the vinyl cyanide monomer (B1b) such as acrylonitrile [for example, an acrylonitrile-styrene copolymer (hereinafter briefly referred to as SAN resin) and others], (2) a copolymer obtainable by polymerizing the styrenic monomer (B1a) and the alkyl (meth)acrylate (B1c) (for instance, a styrene-methyl methacrylate copolymer and so on), (3) a copolymer obtainable by polymerizing the styrenic monomer (B1a), the vinyl cyanide monomer (B1b) and the copolymerizable vinyl monomer (B1c) such as an alkyl (meth)acrylate (e.g. a styrene-acrylonitrile-methyl methacrylate copolymer, etc.), (4) a styrene-maleic anhydride copolymer, a styrene-N-substituted maleimide copolymer and others.

As the preferred styrenic resin (B1), there may be mentioned, for instance, SAN resin, a styrene-acrylonitrile-(meth)acrylic acid alkyl ester copolymer and so on. The non-rubber-modified styrenic resin (B1) can be used singly or in combination.

The proportion of each monomer for preparing the copolymer may be selected from a range, as long as the melt fluidity, the heat resistance and impact resistance of the molded article are not impaired, and is, for example, about 50 to 90% by weight (preferably about 55 to 85% by weight and more preferably about 60 to 80% by weight) of the aromatic vinyl monomer (B1a), about 10 to 40% by weight (preferably about 15 to 35% by weight and more preferably about 20 to 30% by weight) of the vinyl cyanide monomer (B1b), and about 0 to 40% by weight (preferably about 0 to 30% by weight and more preferably about 0 to 20% by weight) of the copolymerizable vinyl monomer (B1c) such as a (meth)acrylic monomer. Use of the aromatic vinyl monomer (B1a) in an amount of less than 50% by weight may possibly cause coloring or deterioration (degradation) of the molded article, and use in a proportion of more than 90% by weight is liable to decrease the heat resistance and the chemical resistance of the shaped article.

Further, when the vinyl cyanide (B1b) is used in a proportion of less than 10% by weight, the chemical resistance of the shaped article is apt to be decreased or reduced, while when it exceeds 40% by weight, the heat stability of the shaped article is likely to be reduced. Moreover, use of the copolymerizable vinyl monomer (B1c) such as a (meth) acrylic monomer in an amount of more than 40% by weight may occasionally decrease the melt fluidity or the properties or characteristics of the shaped article.

As the rubber component in the rubber-modified styrenic resin (B2), there may be mentioned, for example, a non-styrenic rubber-like polymer containing no styrene unit such as a polybutadiene rubber, a butadiene-isoprene rubber, a butadiene-acrylonitrile copolymer, an ethylene-propylene rubber, an EPDM rubber (an ethylene-propylene-nonconjugate diene rubber), a polyisoprene rubber, a polychloroprene rubber, an acrylic rubber and an ethylene-vinyl acetate copolymer; a styrenic rubber-like polymer containing a styrene unit such as a styrene-butadiene copolymer and a styrene-butadiene block copolymer. These rubber-like polymer can be employed singly or in combination.

Preferred examples of the rubber component include a polybutadiene, a butadiene-acrylonitrile copolymer, an ethylene-propylene rubber, an EPDM rubber, an acrylic rubber, a styrene-butadiene copolymer and a styrene-butadiene block copolymer. A polymer containing a butadiene unit (for instance, a polybutadiene, a styrene-butadiene copolymer) may frequently be used as the rubber component.

The glass-transition temperature Tg of the rubber component is not higher than about 0° C., preferably about −150° C. to 0° C., and more preferably about −100° C. to −10° C. Where the glass-transition temperature of the rubber component exceeds 0° C., the impact strength of the shaped article (molded article) is liable to be decreased or impaired.

The rubber-modified styrenic resin may comprise a mixture of the rubber component and the styrenic resin, or may preferably be a high impact resistant styrenic resin obtainable by graft-polymerizing at least a styrenic monomer to a rubber component. As examples of the rubber-modified styrenic resin, there may be mentioned a high impact resistant polystyrene (HIPS) obtainable by polymerizing styrene to a polybutadiene, ABS resin obtainable by polymerizing acrylonitrile and styrene to a polybutadiene, AAS resin obtainable by polymerizing acrylonitrile and styrene to a acrylic rubber, ACS resin obtainable by polymerizing acrylonitrile and styrene to a chlorinated polyethylene, AES resin obtainable by polymerizing acrylonitrile and styrene to an ethylene-propylene rubber (or EPDM rubber), a terpolymer obtainable by polymerizing acrylonitrile and styrene to an ethylene-vinyl acetate copolymer, MBS resin obtainable by polymerizing methyl methacrylate and styrene to a polybutadiene and so on. These rubber-modified styrenic resins can be employed singly or as a mixture of two or more species.

In the rubber-modified styrenic resin (B2), the components other than the rubber component and the proportions thereof are frequently in common with those of the non-rubber-modified styrenic resin. The ratio of the amount of the rubber component (B21) relative to the amount of the polymerizable monomer containing at least an aromatic vinyl monomer can be selected from a wide range depending on the characteristics of the rubber-modified styrenic resin, and is, for example, such that the former/the latter equals about 5/95 to 65/35 (% by weight), preferably about 10/90 to 60/40 (% by weight), more preferably about 15/85 to 50/50 (% by weight), and frequently about 10/90 to 65/35 (% by weight). Graft-polymerization in such ratio can afford a high impact resistant grafted polymer containing the rubber component corresponding to the ratio. In the rubber-modified styrenic resin (B2), the composition of the polymerizable monomers is, for instance, about 20 to 90% by weight and preferably about 21 to 85% by weight of the aromatic vinyl monomer (B1a), about 10 to 40% by weight and preferably about 14 to 38% by weight of the vinyl cyanide monomer (B1b) and about 0 to 40% by weight and preferably about 0 to 30% by weight of the copolymerizable vinyl monomer (B1c) in many cases.

The mean or average particle size of the rubber component dispersed in the rubber-modified styrenic resin (B2), particularly in the grafted polymer, is for instance about 0.05 to 5 $\mu$m, preferably about 0.1 to 3 $\mu$m, and more preferably about 0.1 to 1 $\mu$m. When the mean particle size of the rubber component is less than 0.05 $\mu$m, the impact strength of the shaped article is liable to be decreased, and when it exceeds 5 $\mu$m. the gloss or luster and/or surface appearance of the shaped article is apt to be impaired or deteriorated. The rubber component may be as rubber disperse particles having a plurality of peaks (for example, two peaks) in the particle size distribution.

The styrenic resin (B) may comprise the non-rubber-modified styrenic resin (B1) alone, but it may advantageously comprise at least the rubber-modified styrenic resin (B2), specifically the grafted polymer, for improvement or enhancement of the impact resistance. That is, the preferred examples of the styrenic resin (B) include (1) the rubber-modified styrenic resin (B2) alone, and (2) a mixed resin composition comprising the non-rubber-modified styrenic resin (B1) and the rubber-modified styrenic resin (B2).

For improving or increasing the melt fluidity and molding processability, a mixture of the non-rubber-modified styrenic resin (B1) and the rubber-modified styrenic resin (B2) can frequently be used as the styrenic resin (B). The ratio of the non-rubber-modified styrenic resin (B1) relative to the rubber-modified styrenic resin (B2) may be selected from a wide range, and is, for instance, such that the former/the latter is about 0/100 to 75/25 (% by weight), preferably about 0/100 to 60/40 (% by weight), more preferably about 0/100 to 50/50 (% by weight), and frequently about 10/90 to 40/60 (% by weight). Use of the non-rubber-modified styrenic resin (B1) in a proportion of more than 75% by weight is apt to decrease the impact resistance of the shaped article, and use of the rubber-modified styrenic resin (B2) in an amount of less than 25% by weight is liable to decrease or impair the impact resistance of the shaped article.

When the styrenic resin (B) is a mixed resin composition of the non-rubber-modified styrenic resin (B1) such as SAN resin, and the rubber-modified styrenic resin (B2) such as ABS resin, the content of the rubber component in the styrenic resin (B) is, for instance, about 1 to 50% by weight, preferably about 5 to 40% by weight, and more preferably about 10 to 30% by weight. When using the rubber component in a proportion of less than 1% by weight, the impact resistance of the shaped article may be decreased, and when using it in a proportion of more than 50% by weight, decrease of the melt fluidity, or gelation (gelling), coloring and/or deterioration during the molding process are liable to occur.

The non-rubber-modified styrenic resin may be prepared by a conventional method such as emulsion polymerization, solution polymerization, bulk polymerization, suspension polymerization, and the like. The rubber-modified styrenic resin (grafted polymer) may frequently be prepared by bulk polymerization, suspension polymerization, or emulsion polymerization. In the polymerization, if necessary, an inert solvent such as benzene, ethylbenzene, toluene, xylene and a mineral oil, a molecular weight regulator, an antioxidant, a lubricant, a plasticizer and so on may be added.

[Resin mixture]

By melting and mixing the polycarbonate (A) and the styrenic resin (B), a shaped article having high heat and impact resistance can be obtained. It may probably be because these resins form a polymer alloy. The ratio of the polycarbonate (A) relative to the styrenic resin (B) can be selected from the range according to the species of each of the resins insofar as not impairing the heat resistance, the impact resistance, the melt fluidity and the like, and is for example such that the former/the latter is about 40/60 to 95/5 (% by weight), preferably about 50/50 to 95/5 (% by weight) and more preferably about 55/45 to 85/15 (% by weight). The proportion of the polycarbonate (A) relative to the styrenic resin (B) is frequently such that the former/the latter is about 50/50 to 90/10 (% by weight), particularly about 60/40 to 90/10 (% by weight). Use of the polycarbonate (A) in a proportion of less than 40% by weight is apt to decrease or reduce the heat resistance or the impact resistance of the shaped article, although the melt fluidity is in high level in such case. When the proportion of the polycarbonate (A) exceeds 95% by weight, the melt fluidity during the molding process is liable to be decreased. The content of the rubber component in the resin mixture is, for instance, about 1 to 30% by weight and preferably about 1 to 25% by weight.

[Flame-retardant (C)]

The flame-retardant (C) is an aromatic phosphoric acid ester shown by the formula (I). In the formula (I), the alkyl group which may be substituted on the phenyl group of $R^1$ to $R^4$ includes, for example, a lower alkyl group having about 1 to 4 carbon atoms such as methyl, ethyl, propyl, isopropyl, butyl, isobutyl, s-butyl and t-butyl groups. Among these alkyl groups, an alkyl group having 1 to 3 carbon atoms, particularly methyl group and/or ethyl group is preferred. Each of the phenyl groups may be substituted with about 0 to 3, preferably about 1 to 3 (for instance, 1 or 2, particularly 2) alkyl groups.

As the aromatic residue represented by A, there may be mentioned, for instance, an arylene group including a phenylene group such as 1,2-phenylene group, 1,3-phenylene group and 1,4-phenylene group, hydroquinone residue, naphthalene residue, etc., bisphenol A residue and so on. Preferred aromatic residue includes an arylene group, specifically a phenylene group.

A feature of the present invention resides in the use of, as the flame-retardant, the compound (i) shown by the formula (I) wherein $R^1$ to R4 independently represent a phenyl group substituted with 0 to 3 alkyl groups each having 1 to 4 carbon atoms, and two alkyl group are bonded to a specific position of the phenyl group represented by $R^1$, $R^2$, $R^3$ and $R^4$, the compound (ii) shown by the formula (I) wherein A is 1,3-phenylene group, n is an integer of 1 to 5, and at least one of $R^1$, $R^2$, $R^3$ and $R^4$ is a phenyl group substituted with 1 to 5 alkyl groups each having 1 to 4 carbon atoms, or a mixture of the compound (i) and the compound (ii).

Hereinafter the compound (i) is illustrated. The numbers of the alkyl group(s) for each of the phenyl groups is about 0 to 3, and preferably about 1 or 2 in the compound (i). In such compound, at least one of the substituents $R^1$ to $R^4$ is a 2,4-dialkylphenyl group, a 3,4-dialkylphenyl group or 3,5-dialkylphenyl group. Preferred examples of the dialkylphenyl group include 2,4-dimethylphenyl group, 3,4-dimethylphenyl group, 3,5-dimethylphenyl group, 2,4-diethylphenyl group, 3,4-diethylphenyl group, 3,5-diethylphenyl group, 2-methyl-4-ethylphenyl group, 3-methyl-4-ethylphenyl group, 3-methyl-5-ethylphenyl group, 2-ethyl-4-methylphenyl group, 3-ethyl-4-methylphenyl group, 3-ethyl-5-methylphenyl group, 2,4-dipropylphenyl group, 3,4-dipropylphenyl group, 3,5-dipropylphenyl group, 2,4-diisopropylphenyl group, 3,4-diisopropylphenyl group, 3,5-diisopropylphenyl group and others.

The substituents $R^1$, $R^2$, $R^3$ and $R^4$ may independently be a dialkylphenyl group selected from a 2,4-dialkylphenyl group, a 3,4-dialkylphenyl group and a 3,5-dialkylphenyl group. Use of the compound where the substituents $R^1$ to $R^4$ are respectively a 2,4-dialkylphenyl group, a 3,4-dialkylphenyl group and/or a 3,5-dialkylphenyl group, can remarkably improve the melt fluidity. Meanwhile, when using the compound where all of the substituents $R^1$ to $R^4$ are 2,6-dialkylphenyl groups, the melt fluidity would not improved so much.

Only if comprising such 2,4-dialkylphenyl group, 3,4-dialkylphenyl group and/or 3,5-dialkylphenyl group, the substituents $R^1$ to $R^4$ may further comprise a phenyl group, a monoalkylphenyl group (for instance, 2-methylphenyl group, 3-methylphenyl group, 4-methylphenyl group, etc.), a 2,3-dialkylphenyl group, a 2,5-dialkylphenyl group, a 2,6-dialkylphenyl group (e.g., 2,6-dimethylphenyl group and so on), a trialkylphenyl group (for instance, 2,4,6-trimethylphenyl group) and the like. The compound (i) shown by the formula (I) may usually contain a 2,6-dialkylphenyl group which is a position-isomer relative to the 2,4-dialkylphenyl group, 3,4-dialkylphenyl group and 3,5-dialkylphenyl group, or a phenyl group or a monoalkylphenyl group.

The proportion of the 2,4-dialkylphenyl group, 3,4-dialkylphenyl group and 3,5-dialkylphenyl group based on the total amount of $R^1$, $R^2$, $R^3$ and $R^4$ may be within the range as long as the melt fluidity, the heat resistance and the like are not adversely affected, and is, for instance, about not less than 50 mole percent, preferably about 60 to 100 mole percent, and more preferably about 65 to 100 mole percent. When the proportion of the dialkylphenyl group is less than 50 mole percent, the melt fluidity during the molding process may occasionally be decreased.

Further, when $R^1$, $R^2$, $R^3$ and $R^4$ comprise both a dialkylphenyl group (e.g. a 2,4-dialkylphenyl group, a 2,6-dialkylphenyl group, a 3,4-dialkylphenyl group, a 3,5-dialkylphenyl group, and so on) and a monoalkylphenyl group, the ratio of the 2,4-dialkylphenyl group, 3,4-dialkylphenyl group and 3,5-dialkylphenyl group relative to the monoalkylphenyl group is such that, for example, the former/the latter equals about 50/50 to 95/5 (mole percent), preferably about 50/50 to 90/10 (mole percent), and more preferably about 60/40 to 90/10 (mole percent). The ratio of the dialkylphenyl group relative to the monoalkylphenyl group is frequently such that the former/the latter is about 60/40 to 80/20 (mole percent). When the ratio of the dialkylphenyl group is out of the above-mentioned range, the melt fluidity during the molding process may sometimes be impaired or decreased.

The repeating unit n in the compound (i) of the formula (I) may be an integer of 0 to 5. The compound (i) of the formula (I) wherein the repeating unit n is an integer of 1 to 3, particularly 1 or 2 can advantageously be used for constituting a flame-retardant of an oligomeric phosphoric acid ester.

The flame-retardant (C) may frequently comprise a mixture of phosphoric acid esters differing in the repeating unit n. The mean or average value of such repeating unit n is about 0.5 to 2.0, preferably about 1.0 to 1.8 and more preferably about 1.2 to 1.7. In the mixture of phosphoric acid esters differing or varying in the repeating unit n, the proportion of the compound where n=1 is, for instance, about 40 to 90 mole percent, preferably about 50 to 80 mole percent, and more preferably about 55 to 75 mole percent. To be more concrete, a mixture of the phosphoric acid ester oligomers comprises, in many cases, about 0 to 10 mole percent, preferably about 0 to 7 mole percent and more preferably about 0 to 5 mole percent of the compound having the repeating unit n of 0, about 40 to 90 mole percent, preferably about 50 to 80 mole percent and more preferably about 55 to 75 mole percent of the compound having the repeating unit n of 1, about 5 to 40 mole percent, preferably about 7 to 35 mole percent and more preferably about 10 to 30 mole percent of the compound having the repeating unit n of 2, and about 5 to 25 mole percent, preferably about 7 to 20 mole percent and more preferably about 7 to 17 mole percent of the compound having the repeating unit n of not less than 3. The proportion of the compound having the repeating unit n of not less than 3 may be about 1 to 25 mole percent.

The compound (ii) where A is 1,3-phenylene group and n denotes an integer of 1 to 5 is explained hereinbelow.

The phenyl group substituted with 1 to 5 alkyl groups each having 1 to 4 carbon atoms includes, for instance, a monoalkylphenyl group such as 2-methylphenyl group, 3-methylphenyl group, 4-methylphenyl group, 2-ethylphenyl group, 3-ethylphenyl group, 4-ethylphenyl group, 2-propylphenyl group, 3-propylphenyl group, 4-propylphenyl group, 2-isopropylphenyl group, 3-isopropylphenyl group, 4-isopropylphenyl group, 2-butylphenyl group, 3-butylphenyl group, 4-butylphenyl group, 2-isobutylphenyl group, 3-isobutylphenyl group, 4-isobutylphenyl group, 2-s-butylphenyl group, 3-s-butylphenyl group, 4-s-butylphenyl group, 2-t-butylphenyl group, 3-t-butylphenyl group, 4-t-butylphenyl group and so on; a 2,3-dialkylphenyl group such as 2,3-dimethylphenyl group, 2,3-diethylphenyl group, 2,3-dipropylphenyl group, 2,3-diisopropylphenyl group, 2-ethyl-3-methylphenyl group, 3-ethyl-2-methylphenyl group and the like; a 2,4-dialkylphenyl group such as 2,4-dimethylphenyl group, 2,4-diethylphenyl group, 2,4-dipropylphenyl group, 2,4-diisopropylphenyl group, 2-ethyl-4-methylphenyl group, 4-ethyl-2-methylphenyl group and others; a 2,5-dialkylphenyl group such as 2,5-dimethylphenyl group, 2,5-diethylphenyl group, 2,5-dipropylphenyl group, 2,5- diisopropylphenyl group, 2-ethyl-5-methylphenyl group, 5-ethyl-2-methylphenyl group and so on; a 2,6-dialkylphenyl group such as 2,6-dimethylphenyl group, 2,6-diethylphenyl group, 2,6-dipropylphenyl group, 2,6-diisopropylphenyl group, 2,6-dibutylphenyl group, 2,6-diisobutylphenyl group, 2,6-di-s-butylphenyl group, 2,6-di-t-butylphenyl group, 2-ethyl-6-methylphenyl group and others; a 3,4-dialkylphenyl group such as 3,4-dimethylphenyl group, 3,4-diethylphenyl group, 3,4-dipropylphenyl group, 3,4-diisopropylphenyl group, 3-ethyl-4-methylphenyl group, 4-ethyl-3-methylphenyl group and the like; a 3,5-dialkylphenyl group such as 3,5-dimethylphenyl group, 3,5-diethylphenyl group, 3,5-dipropylphenyl group, 3,5-diisopropylphenyl group, 3-ethyl-5-methylphenyl group and so on; a trialkylphenyl group such as 2,3,4-tri-methylphenyl group, 2,3,5-trimethylphenyl group, 2,3,6-trimethylphenyl group, 2,4,5-trimethylphenyl group, 2,4,6-trimethylphenyl group, 3,4,5-trimethylphenyl group, 4-ethyl-2,6-dimethylphenyl group, 2,6-diethyl-4-methylphenyl group, 4-methyl-2,6-diisopropylphenyl group and others.

The phenyl group substituted with 2 alkyl groups each having 1 to 3 carbon atoms such as methyl, ethyl and propyl groups (for instance, a dimethylphenyl group such as 2,6-dimethylphenyl group, 3,5-dimethylphenyl group, 2,4-dimethylphenyl group and so on) can specifically be used among these groups. Use of such phenyl group substituted with 2 alkyl groups each having 1 to 3 carbon atoms, particularly a dimethylphenyl group can greatly improve the heat resistance of the shaped article. As the phenyl group substituted with 2 alkyl groups each having 1 to 3 carbon atoms, a phenyl group substituted with the alkyl groups on the 2- and 6-positions (e.g., 2,6-dimethylphenyl group, 2,6-diethylphenyl group, 2-ethyl-6-methylphenyl group, etc.) may frequently be employed.

The substituents $R^1$, $R^2$, $R^3$ and $R^4$ may be independently a phenyl group substituted with 1 to 5 alkyl groups each having 1 to 4 carbon atoms. When the compound where the substituents $R^1$ to $R^4$ are the phenyl groups each substituted with 1 to 5 alkyl groups each having 1 to 4 carbon atoms, the melt fluidity, and the light resistance of the shaped article can remarkably be improved or enhanced.

Use of a compound where all of the substituents $R^1$ to $R^4$ are non-substituted phenyl groups notably decrease or impair the light resistance of the shaped article. When using a compound where A is 1,4-phenylene group, the melt fluidity is decreased and the tensile elongation of the shaped article is reduced.

In the compound (ii), the repeating unit n in the formula (I) may be an integer of 1 to 5. The compound (ii) of the formula (I) wherein n is an integer of 1 to 3, particularly 1 or 2, more specifically 1 can advantageously be used for constituting a flame-retardant of an oligomeric phosphoric acid ester (phosphoric ester).

These flame-retardants (flame-retarders) can be employed singly or in combination. Preferably, the flame-retardant (C) comprises at least the compound (i). When a mixture of the compound (i) and the compound (ii) is employed as the flame-retardant (C), the ratio of the compound (i) relative to the compound (ii) can be selected from a wide range, and is, for example, such that the former/the latter is about 1/99 to 99/1 (by weight), preferably about 10/90 to 90/10 (by weight) and more preferably about 30/70 to 70/30 (by weight).

The flame-retardant shown by the formula (I) can be prepared by various methods. By way of illustration, as described in Japanese Patent Application Laid-open No. 1079/1993 (JP-A-5-1079), the flame-retardant can be prepared by allowing a phenol compound corresponding to $R^1$, $R^2$, $R^3$ and $R^4$ (for example, phenol, cresol, xylenol and the like) to react with phosphorus oxychloride and a dihydric phenol corresponding to the aromatic residue A (e.g., resorcinol, hydroquinone, bisphenol A, 1,4-dihydroxybenzene and so on). The ratio of the dialkylphenyl group relative to the monoalkylphenyl group or the like can easily be controlled or adjusted by selecting the species and the amount of the phenol compound corresponding to $R^1$, $R^2$, $R^3$ and $R^4$.

The amount of the compound (C) shown by the formula (I) may be an effective amount to impart the flame-retardancy (fire resistance) to the polycarbonate (A) and the styrenic resin (B), and is, for example, about 5 to 50 parts by weight, preferably about 10 to 30 parts by weight, and more preferably about 15 to 25 parts by weight relative to 100 parts by weight of the mixed resin composition of the polycarbonate (A) and the styrenic resin (B). Use of the flame-retardant (C) in a proportion of less than 5 parts by weight relative to 100 parts by weight of the mixed resin composition can hardly impart high melt fluidity and the high flame-retardancy suited to the UL Standard to the shaped or molded article, and the use in a proportion of more than 50 parts by weight is apt to decrease or impair the heat resistance of the shaped article, although imparting high melt fluidity and flame-retardancy. When the amount of the flame-retardant shown by the formula (I) is about 10 to 25 parts by weight relative to 100 parts by weight of the mixed resin composition, well balanced various characteristics such as the flame-retardancy, heat resistance, impact resistance, melt fluidity, and others can be obtained.

[Fluororesin (D)]

The use of the fluororesin (D) can suppress drip of a kindling substance and a molten mixture, thus the fluororesin (D) acts as a flame-retarding-auxiliary. The fluororesin includes, for example, a mono- or copolymer obtainable by polymerizing a fluorine-containing monomer such as tetrafluoroethylene, chlorotrifluoroethylene, vinyl fluoride, vinylidene fluoride, hexafluoropropylene, perfluoroalkyl vinyl ether and so on; a copolymer obtainable by polymerizing the fluorine-containing monomer and a copolymerizable monomer such as ethylene, propylene and acrylate. Practical examples of the fluororesin include a homopolymer such as polytetrafluoroethylene, polychlorotrifluoroethylene, polyvinylidene fluoride and others; a copolymer such as a tetrafluoroethylene-hexafluoropropylene copolymer, a tetrafluoroethylene-perfluoroalkyl vinyl ether copolymer, a tetrafluoroethylene-hexafluoropropylene-perfluoroalkyl vinyl ether copolymer, an ethylene-tetrafluoroethylene copolymer, an ethylene-chlorotrifluoroethylene copolymer and the like. These fluororesins can be employed singly or in combination. Polytetrafluoroethylene (hereinafter referred to as PTFE) can preferably be used among these fluororesins. The fluororesin may be prepared by a conventional method such as the emulsion polymerization method described in U.S. Pat. No. 2,393,967.

The fluororesin may be compounded or incorporated into the resin composition by melting and mixing with the polycarbonate and the styrenic resin, or may frequently be used in a powdery form, for example as a powder or granule having a mean particle size of about 10 to 5,000 $\mu$m, preferably about 100 to 1,000 $\mu$m, and more preferably about 200 to 700 $\mu$m.

The fluorine-content of the fluororesin may be selected from a range depending on the species of the resin insofar as the flame-retardancy or flame resistance can be imparted to the shaped article, and frequently is, for instance, about 65 to 75% by weight and preferably about 70 to 74% by weight. The apparent density of the powdery or granular fluororesin is, for example, about 0.4 to 0.6 g/cm$^3$, and preferably about 0.43 to 0.47 g/cm$^3$. When the fluororesin is polytetrafluoroethylene, the specific gravity of the fluororesin is about 2.13 to 2.22 g/cm$^3$, and the melting point is about 326° C. to 328° C.

The flame-retarding-auxiliary (D) may be used in an amount of, for instance, about 0.05 to 5 parts by weight, preferably about 0.1 to 2 parts by weight and more preferably about 0.2 to 1 part by weight relative to the 100 parts by weight of the resin mixture. When adding the fluororesin (D) in a proportion of less than 0.05 part by weight, sufficient inhibiting or suppressing effect on the drip of the kindling substance and/or molten drop (drip-inhibiting effect) and thus high flame-retardancy or fire resistance cannot be imparted to the shaped article. Addition of the fluororesin in a proportion of more than 5 parts by weight may increase the shrinkage of the shaped article by heat, with decreasing the dimensional accuracy during heating process as well as with increasing cost.

[Other additives]

The flame-retardant resin composition may also include various additives including, for example, a degradation-inhibitor such as an antioxidant, an ultraviolet-absorber and a light-resistant stabilizer; a lubricant; an antistatic agent; a mold release agent (mold lubricant); a plasticizer; a reinforcing fiber such as a glass fiber, a carbon fiber, a polyamide fiber, an aromatic polyamide fiber, an aromatic polyester fiber and the like; a filler such as calcium carbonate and talc; and a coloring agent such as a pigment. The amount of such additive may be selected from a range according to the species of the additive insofar as not impairing, for instance, the heat resistance, the impact resistance and the mechanical strength of the shaped article. By way of illustration, the additive such as an antioxidant is frequently used in an amount of about 5% by weight or less based on the total amount of the composition, and the reinforcing agent such as a glass fiber and/or the filler is usually employed in a proportion of 50% by weight or less based on the total amount of the composition.

[Preparation of the resin composition]

The flame-retardant (fire resistant) resin composition may be a premixed composition obtainable by premixing the polycarbonate (A), the styrenic resin (B), the flame-retardant (C) and the fluororesin (D) with the use of a mixer such as a V-blender, a supermixer, a superfloater or a Henshell mixer. The resin composition is usually a mixture obtainable by melting and mixing the premixed composition homogeneously. Such mixture can be obtained by melting and kneading the premixed mixture, with using a kneading means, at a temperature of, for example, about 200 to 300° C. and preferably about 220 to 280° C., and pelletizing the resultant mixture. As the kneading means, various melting-mixing apparatus such as a kneader, a uniaxial or biaxial extrusion machine can be employed. The resin composition may frequently be prepared by melting and extruding components for the resin composition using a biaxial extruding machine or the like, and pelletizing the resultant material using a pelletizer.

The flame-retardant resin composition of the present invention has high melt fluidity, whereby not only a miniature article but also a lightweight shaped article and a shaped article having a thin portion can be molded with improved accuracy, and the shaped article can be imparted with high flame-retardancy.

In particular, use of the flame-retardant resin composition comprising the flame-retardant corresponding to the case (ii) can further impart high light resistance in addition to such excellent flame-retardancy to the shaped article.

Accordingly, the flame-retardant resin composition is useful as a molding material for various shaped articles such as a housing and/or enclosure of a home electric apparatus, an OA apparatus and the like, and a thin housing or casing of, for instance, a portable telephone. Such shaped article can be produced by a conventional method, for example by injection molding the pelletized flame-retardant resin composition using an injection molding machine at, for instance, a cylinder temperature of about 220 to 280° C.

The flame-retardant resin composition of the present invention, which comprises a specific flame-retardant of aromatic phosphoric acid ester, has excellent flame-retardancy and fire resistance, as well as high melt fluidity.

Accordingly, by using the composition, not only a large size shaped article such as a housing but also an article having a thin portion or a thinned shaped article can be molded with high accuracy. Further, use of the composition can afford a shaped article having improved or enhanced light resistance, and therefore discoloration or discoloring of the shaped article can be inhibited or suppressed.

Moreover, according to the present invention, where the specific flame-retardant in combination with the fluororesin is added to the mixed resin composition of the polycarbonate and the styrenic resin, the drip from the shaped article during burning can be suppressed and thus high flame-retardancy can be imparted to the shaped article. Further, a shaped article having excellent heat resistance and impact resistance and mechanical strength can be obtained. Furthermore, a shaped article having improved or enhanced light resistance in addition to the above excellent characteristics can be obtained.

EXAMPLES

The following examples are merely intended to illustrate the present invention in further detail and should not be construed as defining the scope of the invention.

In the following examples, the tensile strength (kg/cm$^2$) and the tensile elongation were measured according to ASTM D-638 at a crosshead speed of 5 mm/min., and the bending elasticity (kg/cm$^2$) was measured according to ASTM D-790 at a rate of 3 mm per minute. The Izod impact strength (kg·cm/cm) was determined in accordance with ASTM D-256 using a test piece having a thickness of ¼ inch and formed with cut notches.

The thermal-deforming temperature (° C.) was measured according to ASTM D-256 by permitting a load of 18.56 kg/cm$^2$ to act on a bar having a thickness of ¼ inch. The melt fluidity (g/10 min.) was determined according to Japanese Industrial Standards (JIS) K-7210 under the conditions of a temperature of 230° C. and with a load of 5 kg, and the flame resistance was evaluated in accordance with UL-94 using a test piece having a thickness of ¹⁄₁₆ inch.

The spiral flow length (bar flow length) (mm) was estimated at a cylinder temperature of 240° C., an injection pressure of 750 kgf/cm$^2$, of a width of 20 mm and a thickness of 2 mm.

The light resistance was evaluated by the discoloring degree (ΔE) after light-irradiation on a three steps-formed (three-high) color plate (50 mm×30 mm×1 mm/2 mm/3 mm-thickness) for 300 hours using a xenon lamp. Further, the water-discoloring resistance was estimated by whether or not a white spot on the surface of the three steps-formed color plate was formed after being dipped in water at room temperature for one day.

Example 1

A mixture of thermoplastic resins was prepared using 70 parts by weight of a polycarbonate resin (manufactured by Idemitsu Petroleum Chemicals Co., Ltd., IDEMITSU POLYCARBONATE FN2700, viscosity-average molecular weight of 27,000), 10 parts by weight of the following non-rubber-modified styrenic resin and 20 parts by weight of the following rubber-modified styrenic resin.

The non-rubber-modified styrenic resin: a copolymer having a weight-average molecular weight of 123,000 obtained by emulsion-polymerizing 75 parts by weight of styrene and 25 parts by weight of acrylonitrile in an aqueous solution of a calcium phosphate-containing dispersing agent according to the method described in Japanese Patent Publication No. 51962/1987 (JP-B-62-51962).

The rubber-modified styrenic resin: a grafted polymer obtained, in accordance with the method described in Japanese Patent Application Laid-open No. 320274/1993 (JP-A-5-320274), by emulsion-polymerizing 45 parts by weight of styrene and 15 parts by weight of acrylonitrile in the presence of a rubber component of a polybutadiene rubber and a styrene-butadiene rubber latex.

To 100 parts by weight of the thermoplastic resin mixture, were added 19 parts by weight of a flame-retardant of a phosphoric acid ester (manufactured by Daihachi Chemical Industries Co., Ltd., CR733RS), 0.4 part by weight of polytetrafluoroethylene (manufactured by Daikin Industries Co., Ltd., POLYFLON TFE (grade name F-104), mean particle size of about 500 μm, apparent density of 0.45 g/ml, melting point of 326 to 328° C., specific gravity of 2.14 to 2.20, fluorine-content of about 76%), 0.2 part by weight of an antioxidant and 0.2 part by weight of a heat stabilizer. The resultant mixture was premixed for 40 minutes using a V-blender, and the premixed mixture was molten and extruded with the use of a biaxially kneading-extruding machine and pelletized to give a pellet.

The flame-retardant is the compound of the formula (I), where, in the total amount of $R^1$, $R^2$, $R^3$ and $R^4$, 70% by weight is 2,4-dimethylphenyl group, 3,4-dimethylphenyl group and 3,5-dimethylphenyl group, and 30% by weight is methylphenyl group and ethylphenyl group; and A is 1,3-phenylene group. The flame-retardant comprises less than 3% by weight of the compound having the repeating unit n of 0 and not less than 97% by weight of the compound having the repeating unit n of not less than 1, and which comprises about 70% by weight of the compound having the repeating unit n of 1, about 20% by weight of the compound having the repeating unit n of 2, and about 7% by weight of the compound having the repeating unit n of not less than 3.

The above-obtained pellet was dried in an oven at 80° C. for 4 hours or more, and the dried pellet was injection-molded using an injection molding machine having a mold clamping force of 100 ton at a temperature of 240° C. and at a screw rotating rate of 80 rpm to give a test piece (ASTM No. 2 dumbbell piece, a bar (¼ inch in thickness, 126 mm in length), and a test piece for UL burning test (126 mm×126 mm×1.6 mm in thickness)).

Example 2

Test pieces were obtained in the same manner as Example 1, except that the thermoplastic resin composition was prepared by using (a) 80 parts by weight of a polycarbonate resin (manufactured by Idemitsu Petroleum Chemicals Co., Ltd., IDEMITSU POLYCARBONATE FN2700, viscosity-average molecular weight of 27,000), (b) 10 parts by weight of a copolymer (weight-average molecular weight of 90,000), as a non-rubber-modified styrenic resin, obtained by suspension-polymerizing 15 parts by weight of styrene, 50 parts by weight of α-methylstyrene and 25 parts by weight of acrylonitrile, and (c) 10 parts by weight of a grafted copolymer, as a rubber-modified styrenic resin, obtained by emulsion-polymerizing 56 parts by weight of styrene and 19 parts by weight of acrylonitrile in the presence of a rubber component (25 parts by weight as a solid basis) of a polybutadiene rubber and a styrene-butadiene copolymer rubber latex.

Comparative Example 1

By repeating the procedure of Example 1, test pieces were obtained except for using 16 parts by weight of a flame-retardant of a non-substituted aromatic phosphoric acid ester (manufactured by Daihachi Chemical Industries Co., Ltd., CR733S) where in the formula (I), $R^1$, $R^2$, $R^3$ and $R^4$ are non-substituted phenyl groups, and n is 0 to 4, instead of 19 parts by weight of the flame-retardant of Example 1. In the flame-retardant of the non-substituted aromatic phosphoric acid ester, A is 1,3-phenylene group, and the flame-retardant comprises about 3% of the compound having the repeating unit n of 0, about 70% of the compound having the repeating unit n of 1, about 20% of the compound having the repeating unit n of 2, and about 7% of the compound having the repeating unit n of not less than 3. For adjusting the content of phosphorous in the composition to the same with that in the composition of Example 1, the flame-retardant of non-substituted aromatic phosphoric acid ester was added in an amount of 16 parts by weight.

Comparative Example 2

Test pieces were obtained in the same manner as Example 1, except for employing a the flame-retardant the non-substituted aromatic phosphoric acid ester used in Comparative Example 1 in a proportion of 19 parts by weight, while such amount of the retarder was the same as Example 1.

Comparative Example 3

By using 19 parts by weight of a flame-retardant of a dimeric substituted aromatic phosphoric acid ester (manufactured by Daihachi Chemical Industries Co., Ltd., PX201) in lieu of 19 parts by weight of the flame-retardant of aromatic phosphoric acid ester of Example 1, test pieces were prepared in the same manner as Example 1. The flame-retardant is an aromatic phosphoric acid ester of the formula (I), where $R^1$, $R^2$, $R^3$ and $R^4$ are 2,6-dimethylphenyl groups, A is 1,4-phenylene group and n=1.

Example 3

Test pieces were prepared in the similar manner as in Example 1 except that 10 parts by weight of the following non-rubber-modified styrenic resin and 10 parts by weight of the following rubber-modified styrenic resin were used relative to 80 parts by weight of a polycarbonate resin (manufactured by Idemitsu Petroleum Chemicals Co., Ltd., IDEMITSU POLYCARBONATE FN2700, viscosity-average molecular weight of 27,000), and that the flame-retardant used in Example 1 was employed in an amount of 23 parts by weight, and the fluororesin used in Example 1 was employed in a proportion of 0.6 part by weight.

The non-rubber-modified styrenic resin: a copolymer having a weight-average molecular weight of 140,000 obtained by bulk-polymerizing 63 parts by weight of α-methylstyrene, 10 parts by weight of styrene, 23 parts by weight of acrylonitrile and 4 parts by weight of methyl methacrylate.

The rubber-modified styrenic resin: a grafted copolymer obtained by emulsion-polymerizing 45 parts by weight of styrene and 15 parts by weight of acrylonitrile in the presence of a polybutadiene rubber latex (40 parts by weight as a solid basis).

Example 4

By employing 10 parts by weight of the non-rubber-modified styrenic resin of Example 2 instead of the non-rubber-modified styrenic resin of Example 1, and 20 parts by weight of the rubber-modified styrenic resin of Example 2 in lieu of the rubber-modified styrenic resin of Example 1, and further by using the fluororesin in a proportion of 0.2 part by weight, test pieces were prepared in the same manner as Example 1.

Example 5

Test pieces were obtained in the similar manner as Example 1, except for using 20 parts by weight of the non-rubber-modified styrenic resin of Example 2 and 20 parts by weight of the rubber-modified styrenic resin of the Example 2 relative to 60 parts by weight of a polycarbonate resin (manufactured by Idemitsu Petroleum Chemicals Co., Ltd., IDEMITSU POLYCARBONATE FN2700, viscosity-average molecular weight of 27,000), and for employing the flame-retardant in an amount of 17 parts by weight.

Example 6

The procedure of Example 1 was followed to obtain test pieces except that 80 parts by weight of a polycarbonate resin (manufactured by Idemitsu Petroleum Chemicals Co., Ltd., IDEMITSU POLYCARBONATE FN2700, viscosity-average molecular weight of 27,000), 10 parts by weight of the non-rubber-modified styrenic resin of Example 1, and 10 parts by weight of the rubber-modified styrenic resin of Example 1 were used, and that the amount of the flame-retardant of Example 1 was 40 parts by weight and the proportion of the fluororesin of the Example 1 was 0.2 part by weight.

Comparative Example 4

By using 40 parts by weight of the polycarbonate resin of Example 1, 30 parts by weight of the non-rubber-modified styrenic resin of Example 3 and 30 parts by weight of the rubber-modified styrenic resin of Example 3, and employing the flame-retardant of Comparative Example 2 in an amount of 19 parts by weight, test pieces were obtained in the same manner as Example 1.

Comparative Example 5

Test pieces were obtained in the similar manner as Example 1 except for employing 95 parts by weight of the polycarbonate resin of Example 1, 2.5 parts by weight of the non-rubber-modified styrenic resin of Example 2 and 2.5 parts by weight of the rubber-modified styrenic resin of Example 2, and for using 19 parts by weight of the flame-retardant of Comparative Example 3.

Example 7

The procedure of Example 1 was repeated to obtain test pieces, except for employing 15 parts by weight of the non-rubber-modified styrenic resin of Example 1 (SAN resin) and 15 parts by weight of the rubber-modified styrenic resin of Example 1 (ABS resin) instead of 30 parts by weight of the styrenic resin (B) of Example 1.

Example 8

By using 20 parts by weight of the non-rubber modified styrenic resin of Example 1 (SAN resin) and 10 parts by weight of the rubber-modified styrenic resin of Example 1 (ABS resin) in lieu of 30 parts by weight of the styrenic resin (B) of Example 1, test pieces were obtained in the same manner as Example 1.

The characteristics of the test pieces each obtained in Examples 1 to 8 and Comparative Examples 1 to 5 were evaluated. The results are set forth in Table 1.

In the line of "Species of styrenic resin" in Table 1, the styrenic resin used in Example 1, the styrenic resin employed in Example 2 and the styrenic resin used in Example 3 are designated by the symbols "(1)", "(2)" and "(3)" respectively, and the total amount of the non-rubber-modified styrenic resin and the rubber-modified styrenic resin is shown in the line of "Amount of styrenic resin". In the line of "Species of flame-retardant", the flame-retardants respectively used in Example 1, Comparative Example 1 and Comparative Example 3 are separately indicated by the symbols "(1)", "(2)" and "(3)".

TABLE 1

| | Ex. 1 | Ex. 2 | Comp. Ex. 1 | Comp. Ex. 2 | Comp. Ex. 3 | Ex. 3 | Ex. 4 | Ex. 5 | Ex. 6 | Comp. Ex. 4 | Comp. Ex. 5 | Ex. 7 | Ex. 8 |
|---|---|---|---|---|---|---|---|---|---|---|---|---|---|
| Polycarbonate | 70 | 80 | 70 | 70 | 70 | 80 | 70 | 60 | 80 | 40 | 95 | 70 | 70 |
| Species of styrenic resin | (1) | (2) | (1) | (1) | (1) | (3) | (2) | (2) | (1) | (3) | (2) | (1) | (1) |
| Amount of styrenic resin | 30 | 20 | 30 | 30 | 30 | 20 | 30 | 40 | 20 | 60 | 5 | 30 | 30 |
| Species of flame-retarder | (1) | (1) | (2) | (2) | (3) | (1) | (1) | (1) | (1) | (2) | (3) | (1) | (1) |
| Amount of flame-retarder | 19 | 19 | 16 | 19 | 19 | 23 | 19 | 17 | 40 | 19 | 19 | 19 | 19 |
| Fluororesin | 0.4 | 0.4 | 0.4 | 0.4 | 0.4 | 0.6 | 0.2 | 0.4 | 0.2 | 0.4 | 0.4 | 0.4 | 0.4 |
| Tensile strength | 680 | 730 | 630 | 610 | 690 | 710 | 690 | 620 | 540 | 480 | 790 | 690 | 700 |
| Tensile elongation | 38 | 20 | 50 | 121 | 36 | 28 | 25 | 62 | 110 | 110 | 15 | 28 | 21 |
| Bending elasticity | 289 | 296 | 278 | 252 | 292 | 280 | 283 | 265 | 210 | 213 | 323 | 298 | 301 |

TABLE 1-continued

| | Ex. 1 | Ex. 2 | Comp. Ex. 1 | Comp. Ex. 2 | Comp. Ex. 3 | Ex. 3 | Ex. 4 | Ex. 5 | Ex. 6 | Comp. Ex. 4 | Comp. Ex. 5 | Ex. 7 | Ex. 8 |
|---|---|---|---|---|---|---|---|---|---|---|---|---|---|
| ($\times 10^2$) Impact resistance | 6.0 | 6.3 | 9.2 | 7.5 | 10.5 | 7.2 | 5.9 | 8.1 | — | 5.0 | 13.0 | 5.5 | 5.0 |
| Thermal deforming temperature (° C.) | 77 | 85 | 80 | 76 | 85 | 76 | 81 | 72 | 70 | 68 | 95 | 78 | 79 |
| Melt fluidity (MI) | 26 | 20 | 14 | 18 | 10 | 28 | 15 | 25 | 30 | 50 | 5 | 28 | 30 |
| Bar flow length (mm) | 300 | 253 | 240 | 230 | 210 | 315 | 247 | 282 | 331 | 510 | 110 | 310 | 320 |
| Flame resistance (UL) | V-0 | V-0 | V-0 | V-0 | V-0 | V-0 | V-0 | V-1 | V-0 | V-2 | V-0 | V-0 | V-0 |

As apparent from Table 1, the compositions obtained in Examples 1 to 8 are excellent in flame-retardancy, particularly in the melt fluidity, in comparison with those obtained in Comparative Examples 1 to 4, and thus are useful for molding a large sized or thin shaped article. Meanwhile, the composition obtained in Comparative Example 4 has poor flame-retardancy although having high melt fluidity, and the composition obtained in Comparative Example 5 has low melt fluidity although having high heat resistance.

Example 9

A mixture of thermoplastic resins was prepared using 70 parts by weight of a polycarbonate resin (manufactured by Idemitsu Petroleum Chemicals Co., Ltd., IDEMITSU POLYCARBONATE FN2700, viscosity-average molecular weight of 27,000), 10 parts by weight of the following non-rubber-modified styrenic resin and 20 parts by weight of the following rubber-modified styrenic resin.

The non-rubber-modified styrenic resin: a copolymer having a weight-average molecular weight of 123,000 obtained by suspension-polymerizing 75 parts by weight of styrene and 25 parts by weight of acrylonitrile in an aqueous solution of a calcium phosphate-containing dispersing agent according to the method described in Japanese Patent Publication No. 51962/1987 (JP-B-62-51962)

The rubber-modified styrenic resin: a grafted polymer obtained, according to the method described in Japanese Patent Application Laid-open No. 320274/1993 (JP-A-5-320274), by emulsion-polymerizing 45 parts by weight of styrene and 15 parts by weight of acrylonitrile in the presence of a polybutadiene rubber latex (40 parts by weight as a solid basis).

To 100 parts by weight of the thermoplastic resin mixture, were added 19 parts by weight of a flame-retardant of a phosphoric acid ester (manufactured by Daihachi Chemical Industries Co., Ltd., PX200), 0.4 part by weight of polytetrafluoroethylene (manufactured by Daikin Industries, Co., Ltd., POLYFLON TFE (grade name F-104), mean particle size of about 500 $\mu$m, apparent density of 0.45 g/ml, melting point of 326 to 328° C., specific gravity of 2.14 to 2.20, fluorine-content of about 76%), 0.2 part by weight of an antioxidant and 0.2 part by weight of a heat stabilizer. The mixture was premixed for 40 minutes using a V-blender, and the premixed mixture was molten and extruded with the use of a biaxially kneading-extruding machine and pelletized to give a pellet.

The above-mentioned flame-retardant is the compound of the formula (I) wherein $R^1$, $R^2$, $R^3$ and $R^4$ are 2,6-dimethylphenyl groups, A is a 1,3-phenylene group and n=1.

The above-obtained pellet was dried in an oven at 80° C. for 4 hours or more, and the dried pellet was injection-molded using an injection molding machine having a mold clamping force of 100 ton at a temperature of 240° C., at a screw rotating rate of 80 rpm and at a mold temperature of 80° C. to give a test piece (ASTM No. 2 dumbbell piece, a bar (¼ inch in thickness, 126 mm in length), and a test piece for UL burning test (126 mm×126 mm×1.6 mm in thickness)).

Further, the pellet was injection-molded using an injection molding machine having a mold clamping force (locking force) of 100 ton by a conventional injection molding method to give a three steps-formed color plate having three species of thickness (50 mm×30 mm×1 mm/2 mm/3 mm in thickness).

Comparative Example 6

Procedure of Example 9 was repeated to obtain test pieces except for using 19 parts by weight of a flame-retardant of a non-substituted aromatic phosphoric acid ester of the formula (I) wherein $R^1$, $R^2$, $R^3$ and $R^4$ are non-substituted phenyl groups, A is a 1,3-phenylene group and n is an integer of 0 to 4 (manufactured by Daihachi Chemical Industries Co., Ltd., CR733S), instead of the flame-retardant of aromatic phosphoric acid ester of Example 9. The flame-retardant of the non-substituted aromatic phosphoric acid ester comprises about 3% of the compound having the repeating unit n of 0, about 70% of the compound having the repeating unit n of 1, about 20% of the compound having the repeating unit n of 2 and about 7% of the compound having the repeating unit n of not less than 3.

Comparative Example 7

Test pieces were obtained in the same manner as Example 9, except that 19 parts by weight of a flame-retardant of a dimeric substituted aromatic phosphoric acid ester (manufactured by Daihachi Chemical Industries, Co., Ltd., PX201) was employed in lieu of 19 parts by weight of the flame-retardant of Example 9. The flame-retardant is the aromatic phosphoric acid ester compound of the formula (I) wherein $R^1$, $R^2$, $R^3$ and $R^4$ are 2,6-dimethylphenyl groups, A is 1,4-phenylene group and n=1.

Comparative Example 8

The procedure of Example 9 was followed to obtain test pieces except for employing 19 parts by weight of a flame-retardant of a dimeric substituted aromatic phosphoric acid ester (manufactured by Daihachi Chemical Industries, Co., Ltd., PX202) instead of 19 parts by weight of the flame-retardant of Example 9. The flame-retardant is the aromatic phosphoric acid ester compound of the formula (I) where $R^1$, $R^2$, $R^3$ and $R^4$ are 2,6-dimethylphenyl groups, A is 4,4'-biphenylylene group and n=1.

Example 10

By using 80 parts by weight of a polycarbonate resin (manufactured by Idemitsu Petroleum Chemicals Co., Ltd., IDEMITSU POLYCARBONATE FN2700, viscosity-average molecular weight of 27,000), 10 parts by weight of the non-rubber-modified styrenic resin of Example 9, and 10 parts by weight of the rubber-modified styrenic resin of Example 9, test pieces were obtained in the similar manner as Example 9.

Example 11

Procedure of Example 9 was followed to obtain test pieces except for employing 80 parts by weight of a polycarbonate resin (manufactured by Idemitsu Petroleum Chemicals Co., Ltd., IDEMITSU POLYCARBONATE FN2700, viscosity-average molecular weight of 27,000), 7 parts by weight of the non-rubber-modified styrenic resin of Example 9, and 13 parts by weight of the rubber-modified styrenic resin of Example 9.

Example 12

Test pieces were obtained in the same manner as Example 9, except that 60 parts by weight of a polycarbonate resin (manufactured by Idemitsu Petroleum Chemicals Co., Ltd., IDEMITSU POLYCARBONATE FN2700, viscosity-average molecular weight of 27,000), 20 parts by weight of the non-rubber-modified styrenic resin of Example 9, and 20 parts by weight of the rubber-modified styrenic resin of Example 9 were used.

Example 13

By using 70 parts by weight of a polycarbonate resin (manufactured by Idemitsu Petroleum Chemicals Co., Ltd., IDEMITSU POLYCARBONATE FN2700, viscosity-average molecular weight of 27,000), 20 parts by weight of the non-rubber-modified styrenic resin of Example 9, and 10 parts by weight of the rubber-modified styrenic resin of Example 9, test pieces were prepared in the same manner as Example 9.

Example 14

The procedure of Example 9 was repeated to obtain test pieces, except for employing 70 parts by weight of a polycarbonate resin (manufactured by Idemitsu Petroleum Chemicals Co., Ltd., IDEMITSU POLYCARBONATE FN2700, viscosity-average molecular weight of 27,000), 15 parts by weight of the non-rubber-modified styrenic resin of Example 9, 15 parts by weight of the rubber-modified styrenic resin of Example 9, 25 parts by weight of the flame-retardant of Example 9, and 0.6 part by weight of polytetrafluoroethylene of Example 9.

Example 15

Test pieces were prepared in the similar manner as Example 9, except that 60 parts by weight of a polycarbonate resin (manufactured by Idemitsu Petroleum Chemicals Co., Ltd., IDEMITSU POLYCARBONATE FN2700, viscosity-average molecular weight of 27,000), 20 parts by weight of the non-rubber-modified styrenic resin of Example 9, 20 parts by weight of the rubber-modified styrenic resin of Example 9, and 16 parts by weight of the flame-retardant of Example 9 were used.

Example 16

Test pieces were obtained in the same manner as Example 9, except that 9.5 parts by weight of the flame-retardant of Example 1 and 9.5 parts by weight of the flame-retardant of Example 9 were used instead of 19 parts by weight of the flame retarder of Example 9.

Comparative Example 9

The procedure of Example 9 was followed to obtain test pieces, except that a thermoplastic resin composition was prepared by using (a) 40 parts by weight of a polycarbonate resin (manufactured by Idemitsu Petroleum Chemicals Co., Ltd., IDEMITSU POLYCARBONATE FN2700, viscosity-average molecular weight of 27,000), (b) as the non-rubber-modified styrenic resin, 30 parts by weight of a copolymer (weight-average molecular weight of 90,000) obtained by suspension-polymerizing 25 parts by weight of styrene, 50 parts by weight of α-methylstyrene and 25 parts by weight of acrylonitrile, and (c) as the rubber-modified styrenic resin, 30 parts by weight of a grafted copolymer obtained by emulsion-polymerizing 45 parts by weight of styrene and 15 parts by weight of acrylonitrile in the presence of a polybutadiene rubber latex (30 parts by weight as a solid basis) and a styrene-butadiene copolymer rubber latex (10 parts by weight as a solid basis), and that 19 parts by weight of the flame-retardant of phosphoric acid ester of Comparative Example 6 was employed.

Comparative Example 10

By using 95 parts by weight of the polycarbonate resin of Example 9, 2.5 parts by weight of the non-rubber-modified styrenic resin of Example 9 and 2.5 parts by weight of the rubber-modified styrenic resin of Example 9, as well as 19 parts by weight of the flame-retardant of phosphoric acid ester of Comparative Example 7, test pieces were prepared in the similar manner as Example 9.

Comparative Example 11

Test pieces were obtained in the same manner as Example 9, except that 15 parts by weight of the non-rubber-modified styrenic resin of Example 9, and 15 parts by weight of the rubber-modified styrenic resin of Example 9 were employed, and that the polytetrafluoroethylene was not used.

The characteristics of the test pieces each obtained in Examples 9 to 16 and Comparative Examples 6 to 11 were evaluated. The results are shown in Table 2. In Table 2, the styrenic resins each used in Example 9 and Comparative Example 9 are designated in the line of "Species of styrenic resin" by the symbols "(4)" and "(5)" respectively, and the total amount of the non-rubber-modified styrenic resin and the rubber-modified styrenic resin is set forth in the line of "Amount of styrenic resin". In the line of "Species of flame-retardant", the flame-retardants each employed in Example 9, Comparative Example 6, Comparative Example 7, Comparative Example 8 and Example 16 are defined by the symbols "(4)", "(5)", "(6)", "(7)" and "(8)" separately.

TABLE 2

| | Ex. 9 | Com. Ex. 6 | Comp. Ex. 7 | Comp. Ex. 8 | Ex. 10 | Ex. 11 | Ex. 12 | Ex. 13 | Ex. 14 | Ex. 15 | Ex. 16 | Comp. Ex. 9 | Com. Ex. 10 | Com. Ex. 11 |
|---|---|---|---|---|---|---|---|---|---|---|---|---|---|---|
| Polycarbonate | 70 | 70 | 70 | 70 | 80 | 80 | 60 | 70 | 70 | 60 | 70 | 40 | 95 | 70 |
| Species of styrenic resin | (4) | (4) | (4) | (4) | (4) | (4) | (4) | (4) | (4) | (4) | (4) | (5) | (4) | (4) |
| Amount of styrenic resin | 30 | 30 | 30 | 30 | 20 | 20 | 40 | 30 | 30 | 40 | 30 | 60 | 5 | 30 |
| Species of flame-retarder | (4) | (5) | (6) | (7) | (4) | (4) | (4) | (4) | (4) | (4) | (8) | (5) | (6) | (4) |
| Amount of flame-retarder | 19 | 19 | 19 | 19 | 19 | 19 | 19 | 19 | 25 | 16 | 19 | 19 | 19 | 19 |
| Fluororesin | 0.4 | 0.4 | 0.4 | 0.4 | 0.4 | 0.4 | 0.4 | 0.4 | 0.6 | 0.4 | 0.4 | 0.4 | 0.4 | 0 |
| Tensile elongation | 53 | 72 | 36 | 75 | 60 | 63 | 105 | 38 | 28 | 50 | 46 | 110 | 15 | 50 |
| Bending elasticity ($\times 10^2$) | 268 | 256 | 281 | 242 | 280 | 275 | 255 | 282 | 285 | 265 | 279 | 178 | 320 | 271 |
| Impact strength | 9.2 | 7.2 | 9.3 | 9.5 | 10.5 | 11.2 | 7.2 | 6.8 | 7.8 | 10.9 | 7.6 | 4.0 | 14.0 | 8.9 |
| Thermal deforming temperature (° C.) | 85 | 77 | 86 | 96 | 89 | 87 | 78 | 87 | 79 | 71 | 81 | 68 | 98 | 86 |
| Flame resistance (UL) | V-0 | V-0 | V-0 | V-1 | V-0 | V-0 | V-0 | V-0 | V-0 | V-0 | V-0 | V-2 | V-0 | V-2 |
| Light resistance (ΔE) | 1.7 | 3.1 | 1.8 | 2.2 | 1.7 | 1.8 | 2.0 | 1.5 | 2.1 | 1.2 | 1.8 | — | 3.8 | 1.5 |
| Spiral flow length (mm) | 244 | 260 | 210 | 190 | 225 | 215 | 286 | 260 | 318 | 278 | 272 | 360 | 105 | 250 |

As apparent from Table 2, the compositions obtained in Examples 9 to 16 have high melt fluidity and are useful for molding a shaped article having high flame-retardancy and light resistance which is large shaped or thin shaped and is not liable to be discolored.

The composition obtained in Comparative Example 6 has not only low light resistance but also poor heat resistance and impact resistance in comparison with the composition obtained in Example 9. Further, the flame-retardant employed in Comparative Example 6 is in a liquid form, so that the working properties during the premixing process is decreased or reduced. As compared with the composition obtained in Example 9, the composition obtained in Comparative Example 7 has lower melt fluidity and still less smaller tensile elongation. The composition obtained in Comparative Example 8 is insufficient in flame-resistance and has lower flowability. In the composition of Comparative Example 9, the flame-retardancy is poor although with high melt fluidity, and the composition of Comparative Example 10 has poor melt fluidity though having high heat resistance. The composition obtained in Comparative Example 11 lacks sufficient flame-retardancy and causes a drip in the flame-resistance test. In the shaped articles each obtained in Examples 9 to 16, no spot was formed in the water discoloring resistance test, and to the contrary, as for the shaped articles obtained in Comparative Examples 6 and 10, white spots were formed in the water discoloring resistance test.

What is claimed is:

1. A flame-retardant resin composition, which comprises:

(A) an aromatic polycarbonate;

(B) a styrenic resin;

(C) a flame-retardant of an aromatic phosphoric acid ester shown by the following formula (I)

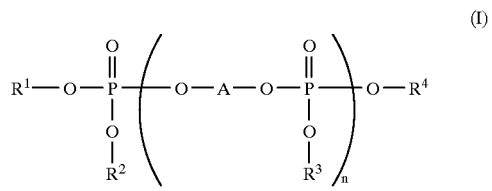

and (D) a fluororesin, wherein said flame-retardant (C) is:

(i) a compound shown by the formula (I) where $R^1$ to $R^4$ independently represent a phenyl group substituted with 0 to 3 alkyl groups each having 1 to 4 carbon atoms, if any, and at least one of $R^1$ to $R^4$ is (1) a 2,4-dialkylphenyl group, a 3,4-dialkylphenyl group, a 3,5-dialkylphenyl group, and (2) a monoalkylphenyl group, wherein the proportion of the amount of the 2,4-dialkylphenyl group, the 3,4-dialkylphenyl group and the 3,5-dialkylphenyl group relative to the amount of the monoalkylphenyl group in $R^1$, $R^2$, $R^3$ and $R^4$ is such that the former/the latter is 60/40 to 90/10 (mole percent); A represents an aromatic residue; and n denotes an integer of 0 to 5; wherein 0 to 10 mole percent has the repeating unit n of 0, 40 to 90 mole percent has the repeating unit n of 1, 5 to 40 mole percent has the repeating unit n of 2 and 5 to 25 mole percent has the repeating unit n of not less than 3; or a mixture of: (i) and (ii) a compound shown by the formula (I) where A is a 1,3-phenylene group; n denotes an integer of 1 to 5; $R^1$, $R^2$, $R^3$, and $R^4$, independently represent a phenyl group which may be substituted with an alkyl group having 1 to 4 carbon atoms and at least one of $R^1$ to $R^4$ is a 2,6-dialkylphenyl group in which each alkyl group has 1 to 4 carbon atoms;

wherein the ratio (A) to (B) is from 40/60 to 95/5 (% by weight), (C) is present in an amount of 5 to 50 parts by weight relative to 100 parts by weight of (A) and (B), and (D) is present in an amount of from 0.05 to 5 parts by weight relative to 100 parts by weight of the resin mixture.

2. A flame-retardant resin composition according to claim 1, where in said compound (i), the alkyl group of the 2,4-dialkylphenyl group, the 3,4-dialkylphenyl group or the 3,5-dialkylphenyl group is an alkyl group having 1 to 3 carbon atoms, and A is a phenylene group.

3. A flame-retardant resin composition according to claim 1, where in said compound (ii), at least one of $R^1$, $R^2$, $R^3$ and $R^4$ is a phenyl group substituted with 2 alkyl groups each having 1 to 3 carbon atoms.

4. A flame-retardant resin composition according to claim 1, where in said compound (ii), n is an integer of 1 to 3.

5. A flame-retardant resin composition according to claim 1, wherein said alkyl group is methyl group or ethyl group.

6. A flame-retardant resin composition according to claim 1, wherein said aromatic polycarbonate (A) is a bisphenol A type aromatic polycarbonate.

7. A flame-retardant resin composition according to claim 1, wherein said fluororesin (D) is a powdery polytetrafluoroethylene.

8. A flame-retardant resin composition according to claim 1, which comprises 5 to 50 parts by weight of the flame-retardant (C) and 0.05 to 5 parts by weight of the fluororesin (D) relative to 100 parts by weight of a mixture of thermoplastic resins comprising 40 to 95% by weight of the aromatic polycarbonate (A) and 5 to 60% by weight of the styrenic resin (B).

9. A flame-retardant resin composition according to claim 1, wherein said styrenic resin (B) comprises a non-rubber-modified styrenic resin (B1) and a rubber-modified styrenic resin (B2) in such a proportion that the former/the latter is 0/100 to 75/25 (by weight).

10. A flame-retardant resin composition according to claim 9, wherein said non-rubber-modified styrenic resin (B1) is a copolymer obtainable by polymerizing 50 to 90% by weight of an aromatic vinyl monomer (B1a), 10 to 40% by weight of a vinyl cyanide monomer (B1b) and 0 to 40% by weight of a copolymerizable vinyl monomer (B1C).

11. A flame-retardant resin composition according to claim 9, wherein said rubber-modified styrenic resin (B2) is a grafted copolymer obtainable by graft-polymerizing 35 to 95% by weight of a polymerizable vinyl monomer comprising at least an aromatic vinyl monomer (B1a) to 5 to 65% by weight of a rubber-like polymer (B21) having a glass transition temperature (Tg) of not higher than 0° C.

12. A flame-retardant resin composition, which comprises:

(A) an aromatic polycarbonate;

(B) a styrenic resin wherein the weight ratio of said aromatic polycarbonate to said styrenic resin is 50/50 to 90/10;

(C) a flame-retardant of an aromatic phosphoric acid ester shown by the following formula (I)

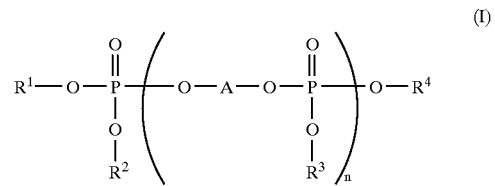

wherein said flame-retardant is:
(i) a compound shown by the formula (I) wherein $R^1$, $R^2$, $R^3$ and $R^4$ independently represent a phenyl group substituted with 0 to 3 alkyl groups each having 1 to 4 carbon atoms, if any, and $R^1$, $R^2$, $R^3$ and $R^4$ comprise at least (a) a 2,4-dialkylphenyl group, a 3,4-dialkylphenyl group or a 3,5-dialkylphenyl group and (b) a monoalkylphenyl group, where the ratio of the total amount of (1) the 2,4-dialkylphenyl group, the 3,4-dialkylphenyl group and the 3,5-dialkylphenyl group relative to (2) the amount of the monoalkylphenyl group in $R^1$, $R^2$, $R^3$ and $R^4$ is such that (1): (2) is 60/40 to 90/10 mole percent, A represents an aromatic residue, and n denotes an integer from 0 to 5, wherein 0 to 10 mole percent has the repeating unit n of 0, 40 to 90 mole percent has the repeating unit n of 1, 5 to 40 mole percent has the repeating unit n of 2 and 5 to 25 mole percent has the repeating unit n of not less than 3; or
a mixture of (i) and (ii) a compound shown by the formula (I) where A is a 1,3-phenylene group, n denotes an integer of 1 to 5 and $R^1$, $R^2$, $R^3$ and $R^4$ independently represent a phenyl group substituted on the 2- and 6-positions respectively with an alkyl group having 1 to 4 carbon atoms; and (D) a fluororesin,
wherein the ratio (A) to (B) is from 40/60 to 95/5 (% by weight), (C) is present in an amount of 5 to 50 parts by weight relative to 100 parts by weight of (A) and (B), and (D) is present in an amount of from 0.05 to 5 parts by weight relative to 100 parts by weight of the resin mixture.

13. The flame-retardant resin composition of claim 1, wherein (1) in said compound (i), the proportion of the amount of the 2,4-dimethylphenyl group, 3,4,-dimethylphenyl group and the 3,5-dimethylphenyl group relative to the amount of monoalkylphenyl groups is such that the former/latter is 60/40 to 80/20 (mole percent), and A is 1,3-phenylene group, or (2) in said compound (ii), $R^1$, $R^2$, $R^3$ and $R^4$ are 2, 6-dimethylphenyl groups and the repeating unit n is 1.

* * * * *